United States Patent Office 3,067,119
Patented Dec. 4, 1962

3,067,119
SURFACE TREATMENT OF FILMS
Lawrence T. Ramaika, Media, Pa., assignor to American Viscose Corporation, Philadelphia, Pa., a corporation of Delaware
Filed Feb. 11, 1960, Ser. No. 8,100
8 Claims. (Cl. 204—168)

The invention relates to the treatment of plastic materials, and particularly shaped structures formed of polyethylene or polypropylene polymers, to improve the anchorage or adherence characteristics of the surfaces thereof.

As is generally known, the chemically inert character of the paraffin-like surfaces of structures formed of polyethylene and polypropylene polymers renders the same unreceptive to printing and adhesives. This difficulty has been overcome by oxidizing the surfaces of the polyethylene and polypropylene structures to form carbonyl, peroxide, and chain unsaturated groups which thus permit the surfaces of such structures to be wet by conventional printing inks and adhesives. Initially, this surface oxidizing treatment had been effected by employing strong chemical oxidizing agents and by chlorination. An alternative procedure has been to impinge one surface of the structure with an oxidizing gas flame while the remainder of the structure is kept cool. A more recent approach has been to subject the surfaces of a finished structure to the action of high voltage electric stress accompanied by corona discharge.

The electrostatic method of treatment mentioned above involves the application of a potential between a pair of spaced electrodes. When the potential on the discharge electrode exceeds the breakdown potential of the air between the electrodes, a corona discharge results thus ionizing the air and producing ozone and oxides of nitrogen. In addition, heat is evolved and it is believed that this combination of heat and the ozone atmosphere serves to effect the desired oxidizing treatment.

In treating polyethylene or polypropylene films by the above-described process, the film is generally passed over a metallic roller which, when rotated, advances the film relative to a stationary electrode. The roller itself is grounded and cooperates with the stationary electrode in providing an electric glow discharge for modifying the exposed film surface as it is advanced therethrough. While polyethylene and polypropylene films both posses desirable dielectric characteristics, the presence of minute holes or foreign particles, such as dust or carbonaceous materials, in the films destroy or weaken their electrical insulating characteristics. Thus, as these defective film areas are advanced into an electrostatic treating zone arcing occurs between the electrodes, causing the defective film areas to be damaged, and more important, often marring the finished surface of the roller.

As evidence of arcing between electrodes, the roller surface exhibits small craters surrounded by irregular ridges of metal which project above the finished surface of the roller. Aside from eventually requiring a shutdown of the apparatus and a refinishing of the roller surface, these ridges of metal projecting from the roller surface cause variations in the spacing between the electrodes and thus introduce conditions which are conducive to further electrode arcing.

While various proposals have been made in an attempt to minimize damage to the roller electrode, the most generally accepted practice is to coat the roller with a thermoplastic material, such as "Mylar," which has good dielectric properties and is advantageous from the standpoint of economy and ease of application. These roller coatings protect the roller surface by absorbing the effects of electrode arcing. In this process, however, the roller coatings are themselves burned and pitted, thus again necessitating costly shut-down of the apparatus for replacement of the roller coatings. Accordingly, a primary object of this invention is to provide an improved method and apparatus for electrostatically treating a surface of a plastic and particularly polyethylene or polypropylene structure to render the same more receptive to printing inks and adhesives.

Another object is the provision of an improved method for electrostatically treating the surface of a continuous polyethylene or polypropylene film or other shaped structure wherein at least two thicknesses of film are continuously advanced between a pair of spaced electrodes.

Still another object is to provide an improved method and apparatus for electrostatically treating a surface of a polyethylene or polypropylene film wherein the film being treated is laced for repeated passes between a pair of cooperating electrodes to provide at least one layer of film as an electrical buffer insulation for protecting the treating apparatus from the effects of electrode arcing.

These and other objects and advantages of the invention will become apparent from the following description and accompanying drawing in which.

The invention contemplates an improved method and apparatus for treating plastic structures, and particularly films formed of polyethylene and polypropylene, to render the surfaces thereof more receptive to printing inks and adhesives. In general, the method of the present invention is effected by continuously passing at least two layers of film through an electric glow discharge created between a pair of spaced electrodes, whereby at least one layer of film serves as an electric buffer insulation which absorbs the effects of arcing between electrodes arising from minute holes or the presence of foreign particles in that portion of the film being treated. The passage of more than one layer of film through the electric glow discharge may be achived by using two simultaneously advancing independent films or alternatively, a single film may be laced for multiple passes between the electrodes. In view of the continuous film travel through the electric glow discharge, a different longitudinal portion of the film serves as an electric buffer insulation, and thus damage to any one portion of this electric buffer insulation as a result of temporary electrode arcing is not repeatedly reflected in any portions of the film which are subsequently treated.

The present invention is hereafter described as applied to electrostatic-treating of continuous films formed of polyethylene and polypropylene polymers. It will be understood, however, that the teachings of the invention are applicable to structures of other shapes, such as tapes, flattened tubes, yarns, etc., as well as to treating structures formed of plastic materials other than polyethylene and polypropylene, such as saran, vinyl chloride copolymers, etc.

For the sake of clarity and simplicity the present invention will be described as applied to films taken from mill or supply rolls which are substantially at room temperature. The teachings of this invention, however, may be incorporated into conventional film extrusion apparatus whereby surface treatment may be effected after the polymeric film-forming material has been extruded and chilled or at any other desired stage of the film manufacture.

With the exception of using bare or uncovered grounded rolls or electrodes, as more fully described hereafter, the construction and operation of the electrical apparatus for providing the electric glow discharge between the cooperating grounded rolls and electrodes is generally similar to that employed in conventional or known electrostatic treating apparatus, as for example as described in Modern Plastics, July 1959, pages 101 et seq., and does not itself constitute a part of this invention. As employed hereafter the term "electrode" refers to a conventional electrode structure which is bare or free of insulating dielectric material.

Figure 1:
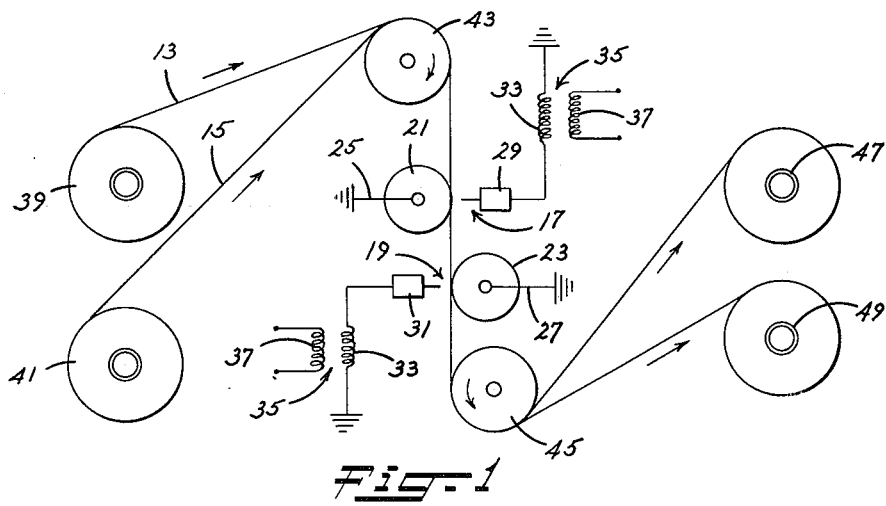
FIGURE 1 is a diagrammatic view illustrating one mode of electrostatically treating the exposed surfaces of a pair of continuous overlapped films in accordance with the present invention.

With reference to FIGURE 1 of the drawing, the embodiment of the invention there disclosed is designed to effect electrostatic treatment of the exposed surfaces of two independent films 13 and 15 by means of similar electrode arrangements 17 and 19 which are disposed in tandem relationship. The electrode arrangements 17 and 19 each include a smooth surface metal roll 21 and 23, respectively, preferably formed of stainless steel. The rolls 21 and 23 are positively driven by suitable means, not shown, and are electrically grounded by conductors 25 and 27. Electrodes 29 and 31 are mounted opposite of and in spaced-apart relationship with the respective rolls 21 and 23 and are each supplied with a high voltage, high frequency current from the secondary windings 33 of independent transformers 35. The transformers 35, as heretofore mentioned, are of conventional construction, each having a primary winding 37 connected to a suitable electric source.

The films 13 and 15 are disposed in overlapping relationship as they are drawn from supply rolls 39 and 41 and are guided by idler rolls 43 and 45 through the electric glow discharge formed between the cooperating grounded rolls and electrodes, after which the treated films are separated and collected on individual roll cores 47 and 49. The electrodes 29 and 31 are positioned along opposite sides of the path traversed by the overlapped films as they are advanced between the idler rolls 43 and 45 so as to effect a sequential treatment of both exposed surfaces of the films 13 and 15. Thus, as the overlapped films pass over the idler roll 43 the film 15 is engaged with the surface of the grounded roll 21 while the exposed surface of the film 13 is subjected to the electric glow discharge created between the roll 21 and its opposing electrode 29. Upon further advance of the overlapping films toward the idler roll 45, the film 13 is engaged with the surface of the grounded roll 23 and in this instance electrostatic treatment of the exposed surface of the film 15 is effected. While the apparatus of FIGURE 1 has been described as being employed in the electrostatic treatment of the exposed surfaces of two individual films, it will of course be understood that the same lacing arrangement of overlapping films may be employed in treating the surface of only one film.

As heretofore mentioned, the presence of minute holes or particles of foreign or agglomerated material in the film constitute areas of weak dielectric strength and thus as these defective areas of the film are advanced into the electric glow discharge they present conditions which are conducive to the flow of current from the treating electrode to its opposing grounded roll. This current flow, which is in the form of an arc, may damage the defective film areas and, in the case of conventional electrostatic treating devices, may also mar the grounded roll or its protective covering. With the present invention, however, the passing of two layers of film through the electric glow discharge at all times provides one thickness of film which serves as an electric buffer insulation for absorbing the effects of electric arcing and thereby protect the uncovered grounded roll from damage. Thus, in passing through the electric glow discharge created between the grounded roll 21 and the electrode 29, the film 15 serves as an electric buffer insulation while during the travel of ground roll 23 and the electrode 21 the film 13 assumes this function. In view of the continuous travel of the films 13 and 15 relative to the electrostatic treating elements of the apparatus, it will be noted that the electric buffer insulation is constantly changed so that damage to any one section of the films 13 and 15 due to electrode arcing is not repeatedly reflected in those portions of the films which are subsequently treated.

Figure 2:
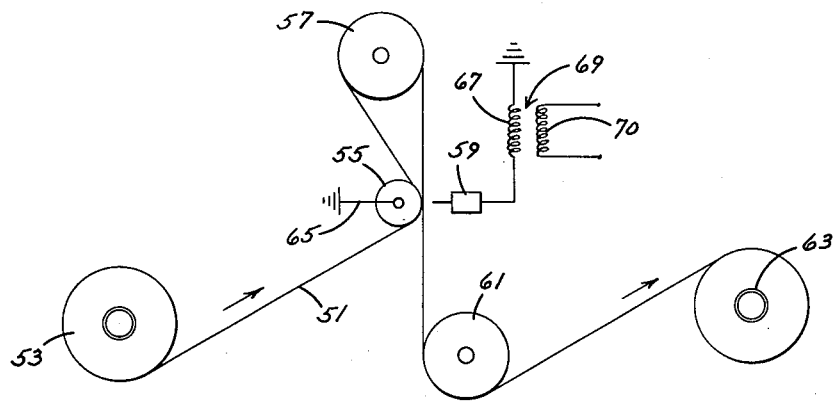
FIGURE 2 is a view similar to FIGURE 1 illustrating a modified arrangement for electrostatically treating one surface of a single film.

In lieu of the arrangement described above, the film undergoing treatment may be laced for repeated passes through an electric glow discharge whereby at least one thickness of film serves as an electrical buffer insulation. Thus, as shown in FIGURE 2, a film 51 is drawn from a supply roll 53, engaged with a positively driven metal roll 55, and passed over an idler roll 57. The path of the film 51 is reversed as it travels over the roll 57 with the film then moving relative to a fixed electrode 59 and over an idler roll 61 to a collection roll core 63. The roll 55 is grounded by a conductor 65 and corresponds in both structure and function to the rolls 21 and 23 heretofore described. Similarly, the electrode 59 is constructed and operates in substantially the same manner as the electrodes 29 and 31, being energized through a secondary winding 67 of a transformer 69, which in turn has a primary winding 70 connected to a suitable electric source.

With the apparatus and film lacing pattern shown in FIGURE 2, electrostatic treatment of the exposed surface of the film 51 is effected as the film moves through the electric glow discharge during its travel between the rolls 57 and 61. The portion of the film engaged with the grounded roll 55 serves as an electric buffer insulation and thereby shields the roll surface from the effects of electric arcing which may arise as defective film portions pass through the electric glow discharge. As with the arrangement of FIGURE 1, damage to the film 51 due to electrical arcing through defective film areas is not repeatedly reflected in the portions of the film which are subsequently treated in view of the continuous travel of the film relative to the grounded roll.

Figure 3:
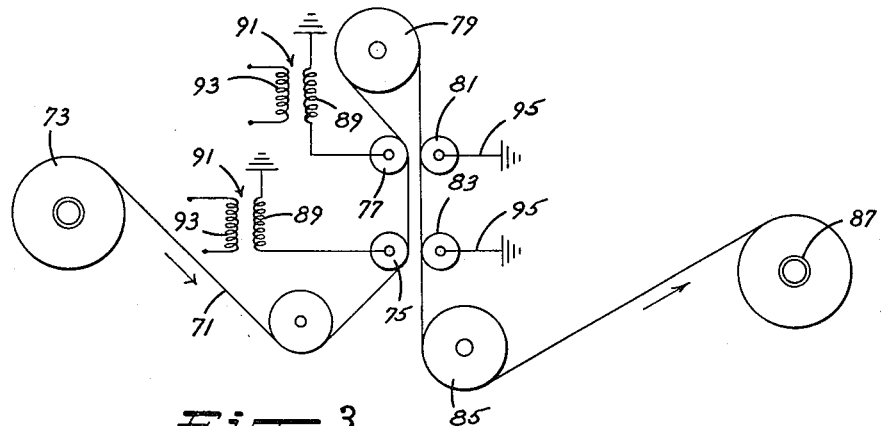
FIGURE 3 is a view similar to FIGURE 2 showing a still further arrangement incorporating electrostatic treating devices disposed in tandem.

The modification of the invention illustrated in FIGURE 3 is generally similar to that shown in FIGURE 2, with the exception that a pair of electrostatic treating devices are employed in tandem to effect a sequential, and perhaps greater, oxidation of one surface of a film. With this arrangement, a film 71 is drawn from a supply roll 73, engaged with roll-type electrodes 75 and 77 and then passed over an idler roll 79. The path of the film 71 is reversed as it travels over the roll 79, with the film then being engaged with positively driven metal rolls 81 and 83 as it is advanced toward an idler roll 85 and to a collection core 87.

As noted above, the electrodes 75 and 77 are of roll-type construction to assist in the movement of the film 71 and are connected to a secondary winding 89 of transformers 91, each having a primary winding 93 connected to a suitable electric source. The electrodes 75 and 77 and the driven rolls 81 and 83, the latter of which are grounded by conductors 95, function in the same manner as the corresponding structures shown in FIGURE 1. In using the embodiment of the invention disclosed in FIGURE 3, it will be noted that the opposing inside surfaces of the film are subjected to electrostatic treatment as they are sequentially advanced through the electric glow discharge zones and that one thickness of film serves as an electric buffer insulation which shields the grounded rolls 81 and 83 from the effects of electric arcing. As with the arrangements previously described, damage to the film as a result of electric arcing is not repeatedly reflected in the portions of the film which are subsequently treated in view of the continuous film travel through the treating apparatus.

While preferred embodiments of the invention have been shown and described, it is to be understood that changes and variations may be made without departing from the spirit and scope of the invention as defined in the appended claims.

I claim:

1. A method of improving the surface anchorage characteristics of plastic structures which comprises passing the plastic structure along with a layer of dielectric material into an electric glow discharge formed between a pair of spaced bare electrodes, said layer of dielectric material serving as an electric buffer insulation for shielding the electrode surfaces against damage in the event of temporary electrode arcing, and continuously and concomitantly advancing the plastic structure and layer of dielectric material through the electric glow discharge and relative to both of said electrodes whereby damage to any one portion of the layer of dielectric material is not repeatedly reflected in portions of the plastic structure subsequently passed through the electric glow discharge.

2. A method as defined in claim 1 wherein the plastic structure and dielectric material are two continuous and independent plastic films.

3. A method of improving the surface anchorage characteristics of a continuous plastic film which comprises continuously advancing the plastic film along at least two simultaneous passes through an electric glow discharge formed between a pair of spaced electrodes whereby at least one thickness of the plastic film serves as an electric buffer insulation for protecting the electrode surfaces in the event of temporary electrode arcing.

4. A method of improving the surface anchorage characteristics of continuous plastic structures which comprises continuously advancing the plastic structure into an electric glow discharge formed between a pair of spaced electrodes and doubling the plastic structure upon itself at least once to cause at least two layers of the plastic structure to travel simultaneously through the electric glow discharge whereby at least one thickness of the plastic structure serves as an electric buffer insulation for protecting the electrode surfaces in the event of temporary electrode arcing.

5. In a method for improving the surface anchorage characteristics of a continuous plastic structure wherein the plastic structure is passed through an electric glow discharge formed between an electrode and grounded support, the improvement comprising reversing the travel of successive portions of the plastic structure after passage thereof through the electric glow discharge and again directing such successive portions of the plastic structure through the electric glow discharge whereby the layer of the plastic structure traveling adjacent to the grounded support serves as an electric buffer insulation.

6. A method as defined in claim 3 wherein the plastic film is formed of thermoplastic polymeric material and is directed through only two passes through the electric glow discharge.

7. A method for improving the surface anchorage characteristics of a continuous plastic film formed of thermoplastic polymeric material which comprises establishing an electric glow discharge between at least one pair of spaced bare electrodes, continuously advancing the film longitudinally through the electric glow discharge, reversing the travel of successive portions of the film after the passage thereof through the electric glow discharge and again directing such successive film portions through the electric glow discharge, and maintaining the different portions of the film traveling through the electric glow discharge separated from each other whereby opposing surfaces of such different film portions are simultaneously subjected to the effects of the electric glow discharge as they travel therethrough.

8. Apparatus for treating a continuous polymeric film to improve the surface anchorage characteristics thereof including a pair of bare electrodes disposed in opposing and spaced apart relationship, means for producing an electric glow discharge between said electrodes, means at one side of said electrodes for directing a continuous film between said opposing electrodes, means at the opposite sides of said electrodes for reversing the path of the continuous film and directing the same along a second pass through the electric glow discharge, and means cooperating with said last mentioned means for maintaining the different portions of the film traveling between said electrodes spaced from each other whereby opposing surfaces of the film are simultaneously subjected to the effects of the electric glow discharge as they travel therethrough.

References Cited in the file of this patent

UNITED STATES PATENTS

| | | |
|---|---|---|
| 2,608,717 | Kay | Sept. 2, 1952 |
| 2,810,933 | Pierce et al. | Oct. 29, 1957 |
| 2,935,418 | Berthold et al. | May 3, 1960 |